Oct. 7, 1958 C. B. SPASE 2,855,079
TORQUE METERING VIBRATION DAMPENING CLUTCH
Filed April 22, 1957 3 Sheets-Sheet 1

INVENTOR.
Charles B. Spase
BY
D. Emmett Thompson
ATTORNEY.

Oct. 7, 1958  C. B. SPASE  2,855,079
TORQUE METERING VIBRATION DAMPENING CLUTCH
Filed April 22, 1957  3 Sheets-Sheet 2

INVENTOR.
Charles B. Spase
BY
D. Emmett Thompson
ATTORNEY.

United States Patent Office 2,855,079
Patented Oct. 7, 1958

2,855,079

TORQUE METERING VIBRATION DAMPENING CLUTCH

Charles B. Spase, Syracuse, N. Y., assignor to Lipe-Rollway Corporation, Syracuse, N. Y., a corporation of New York Application April 22, 1957, Serial No. 654,258

5 Claims. (Cl. 192—55)

This invention relates to torque metering clutches of the type to be used in connection with automotive accessories, such as fans, compressors, generators, etc., wherein the amount of torque which is to be transmitted to such accessories must be limited to a predetermined maximum in order to prevent improper operation of the accessories.

Due to the fact that automotive engines are of the multi-cylinder reciprocating type the cylinder connection to the crankshaft transmits a non-uniform or interrupted flow of torque to the crankshaft, which in turn creates torsional vibration in the crankshaft. This torsional vibration is objectional since it causes a faulty operation of those elements which take their operating torque from the crankshaft.

Accordingly, it is an object of this invention to provide a torque metering clutch which has an arrangement of parts to dampen such torsional vibration in order that a smoother, more nearly uniform torque may be delivered by the engine crankshaft.

The invention consists in the novel features and in the combinations and constructions hereinafter set forth and claimed.

In describing this invention, reference is had to the accompanying drawings in which like characters designate corresponding parts in all the views.

In the drawings—

Figure 2:
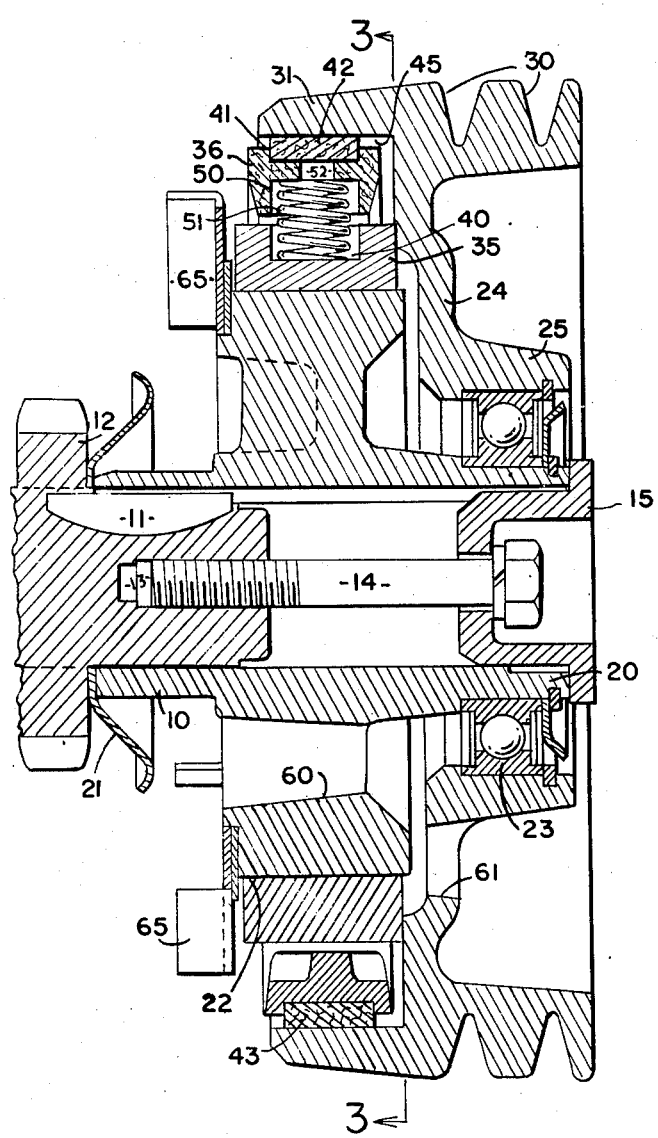
Figure 2 is a cross section taken on line 2—2 of Figure 1.

Referring to Figure 2, the torque metering clutch is made up of a driving member 10 which is connected, by means of a key 11, to the engine crankshaft 12. The crankshaft 12 has a threaded aperture 13 for the reception of a fastener 14 which is inserted through a fastening plate 15 mounted on the forward or hub portion 20 of the driving member 10. As will be seen, the key 11, fastener 14, and fastening plate 15 cooperate to effect a fixed engagement between the crankshaft 12 and the driving member 10. Interposed between the shaft 12 and the rearward end of the driving member 10 is an oil slinger 21 which is utilized to keep any oil from seeping out of the engine crankcase.

The driving member 10 is formed with an annular friction drum surface 22 to be utilized for a purpose hereinafter described.

A bearing 23 is mounted on the hub 20 of the driving member and the driven member 24, which has a hub 25, is journalled on the bearing 23. The driven member 24 is formed with a pair of pulley sheaves 30 for the reception of V belts, or the like, in order to connect the driven member to automotive accessories. The driven member 24 further has an inwardly extending annular flange 31 surrounding the driven member 10 in spaced concentric relation to the drum surface 22.

Figure 3:
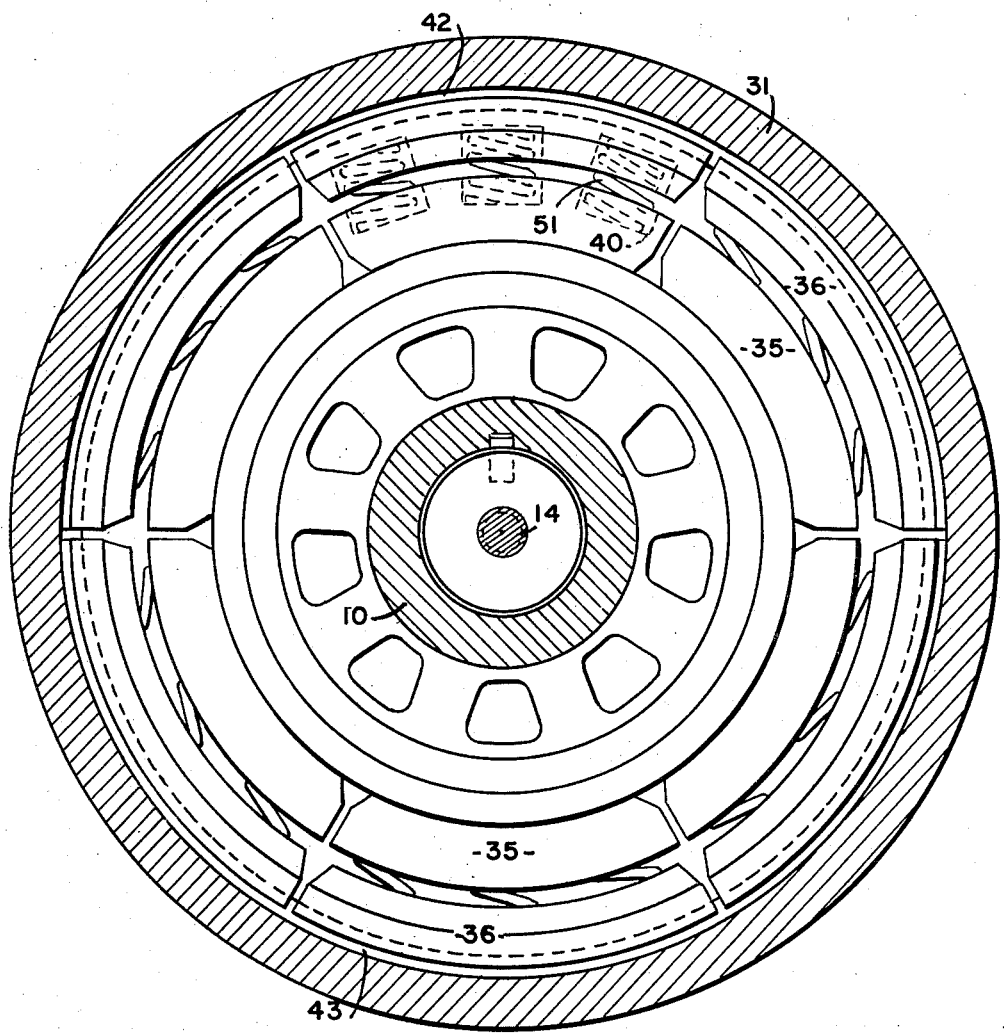
Figure 3 is a cross section taken on line 3—3 of Figure 2.

Mounted in the space between the flange 31 and the drum surface 22 are a plurality of pairs of friction shoes comprising a series of inner friction shoes 35 and a series of outer friction shoes 36, see Figure 3. As will be seen, the plurality of inner friction shoes 35 frictionally engage the drum surface 22 and have recesses 40 formed in their outer surfaces.

The outer friction shoes 36 have an annular peripheral recess 41 (see Figure 2) in which a pair of semi-circular brake bands 42 and 43 are received. As will be seen from Figure 2 and Figure 3, the brake bands 42 and 43 frictionally engage the smooth inner surface 45 of the flange 31 on the driven member 24. The outer shoes 36 also have a plurality of recesses 50 on their inner surface in radial alignment with and confronting the recesses 40 in the inner shoes 35. Received in the aligned confronting recesses 40 and 50 are a plurality of helical compression springs 51 which yieldably urge the shoes 35 and 36 apart.

Figure 1:
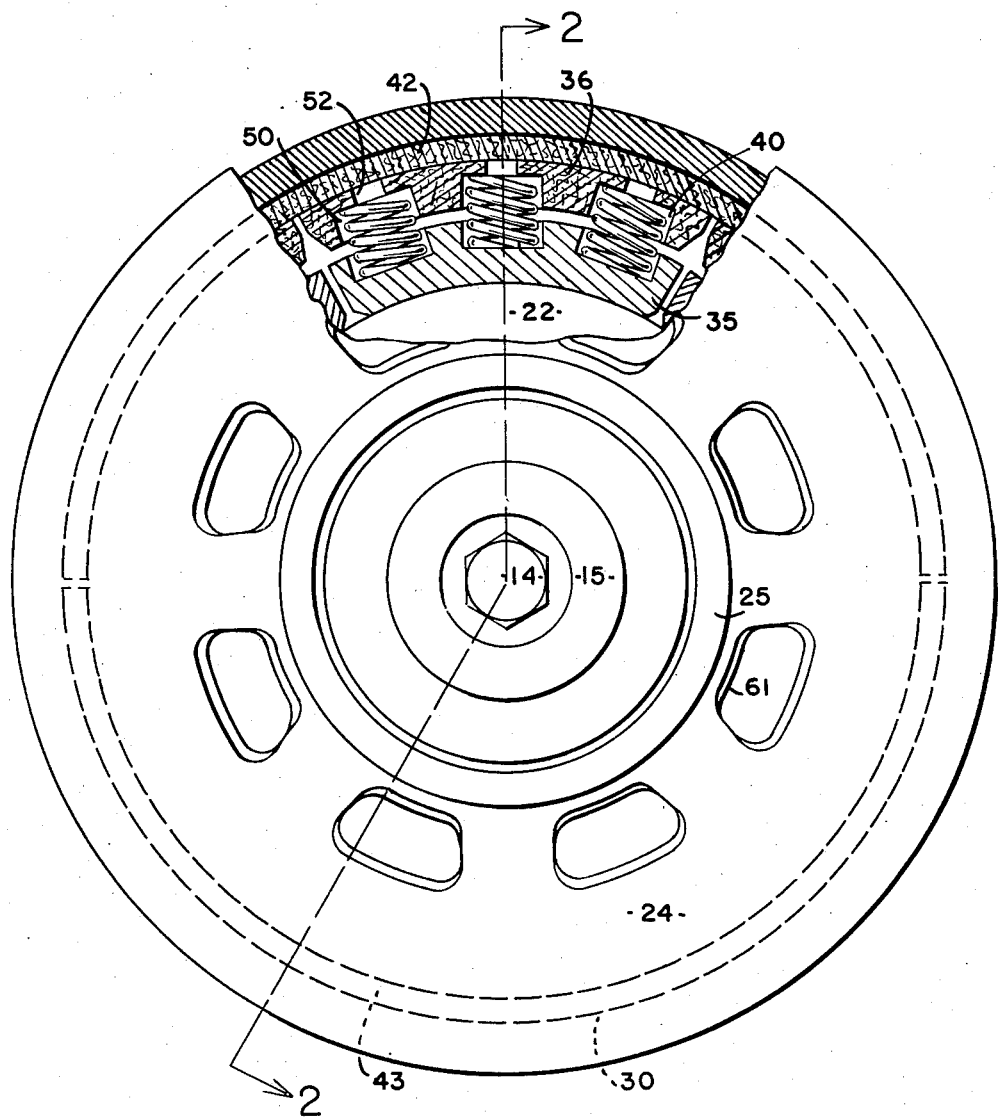
Figure 1 is a front elevation of the invention shown partly broken away and partly in section.
Figure 4:
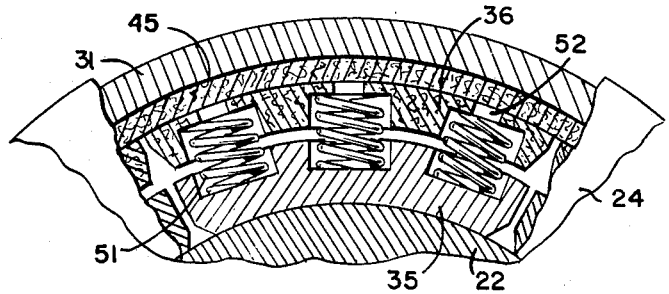
Figure 4 is a fragmentary view, partially in sections of a modified form of my invention.

As will be seen from Figure 1, the outer shoes 36 further have a plurality of apertures 52 in the shoes between the recesses 50 and the outer surfaces of the shoes. These apertures 52 are provided in the shoes for the purpose of allowing air to circulate through the apertures to cool the heat generated in the shoes 36 and the brake bands 42 and 43.

As will be seen from Figure 2, the driving member 10 has a plurality of axial apertures 60 extending therethrough in circumferentially spaced relationship about the periphery of the driving member 10. The driven member 24 also has a plurality of circumferentially spaced axial apertures 61 which register with and communicate with the apertures 60 to form flow channels whereby air may be circulated between the driving and driven members to cool heat generated in said members.

A drive connection is effected between the driving member 10 and the driven member 24 by means of the friction shoes 35, compression springs 51, friction shoes 36, and the brake bands 42, 43. As will be seen, these springs 51 urge the shoes 35 and 36 apart, thus urging the shoes 35 into frictional driving engagement with the drum surface 22, and the shoes 36 are urged outwardly to force the friction bands 42 and 43 into frictional driving engagement with the smooth inner surface 45 of the flange 31 on the driven member 24, thus effecting rotation of the driven member 24 which is connected by any convenient means through the pulley sheaves 30 to the driven accessory, or accessories. As will be obvious whenever the speed of the driving member 10 reaches a certain predetermined level, centrifugal force acting upon the shoes 35 against the springs 51 will decrease the pressure they exert upon the shoes 35, thus allowing slippage to take place between the drum surface 22 and the shoes 35, thereby limiting or metering the amount of torque transmitted from the driving member 10 to the shoes 35 to the predetermined level at said predetermined speed.

However, since a multi-cylinder engine of the reciprocating type delivers a non-uniform or interrupted torque to the crankshaft, torsional vibration is present in the crankshaft. This torsional vibration is dampened, so that a more uniform torque is transmitted by the crankshaft, by the springs 51 and by reason of the fact that slippage may take place between the brake bands 42, 43 and the smooth inner surface 45 on the driven member 24 and the shoes 35 and surface 22.

The springs 51 must dampen the torsional vibration because they are in fact the drive connectors between the shoes 35 and the shoes 36 and consequently between the driving member 10 and driven member 24. The springs absorb such vibration by bowing slightly in one direction whenever the transmitted interrupted torque has a value higher than the combined inertia of the driven member and accessories connected thereto, at which time slippage will also take place between the bands 42, 43 and the surface 45 and between the shoes 35 and the surface 22, the combined action of the springs bowing and the slippage at the surfaces 45, 22, dampening the torsional vibration. Conversely, whenever the value of the transmitted interrupted torque is lower than the combined inertia forces in the driven member and the accessories connected thereto, the springs will bow slightly in the opposite direction thus acting, together with the slippage taking place between the bands 42, 43 and the surface 45 and between the shoes 35 and surface 22 to absorb the torsional vibration.

As is well known the torque transmitted by the automotive engines of the type heretofore recited has sinusoidal wave characteristics, thereby giving high and low peak values of the torque transmitted. The bowing of the springs 51 and slippage taking place between the brake bands 42, 43 and the surface 45 and between the shoes 35 and surface 22 will dampen such alternating or interrupted torque so that a more nearly uniform torque approaching straight line characteristics will be transmitted by the crankshaft, so that the elements which take their operating torque from the crankshaft will function more efficiently.

What I claim is:

1. A torque metering and vibration dampening clutch comprising driving and driven members, said driving member including a drum having a peripheral friction surface, said driven member having a portion encircling said drum in spaced concentric relation thereto and having a circular friction surface confronting the drum, a circular series of inner friction shoes positioned on said drum surface, a circular series of outer friction shoes positioned against the friction surface of said driven member, said shoes being arranged in radial pairs, and means yieldingly urging said inner shoes into frictional engagement with the surface of said drum and yieldingly urging said outer shoes into engagement with the frictional surface of the driven member, said means constituting the driving connection between said shoes.

2. A torque metering and vibration dampening clutch comprising driving and driven members, said driving member including a drum having a peripheral friction surface, said driven member having a portion encircling said drum in spaced concentric relation thereto and having a circular friction surface confronting the drum, a circular series of inner friction shoes positioned on said drum surface, a circular series of outer friction shoes positioned against the friction surface of said drive member, said shoes being arranged in radial pairs, the confronting surfaces of the shoes of each pair being formed with a recess and a spring positioned in said recesses and yieldingly urging said inner shoes into frictional engagement with the surface of said drum and yieldingly urging said outer shoes into engagement with the frictional surface of the driven member, said spring constituting the driving connection between said shoes.

3. A torque metering vibration dampening clutch having driving and driven members, said driving member having an external friction drum surface thereon and having a central hub, said driven member being journalled on said hub and having an annular flange encircling said drum surface in spaced concentric relation thereto, said flange having a smooth inner surface confronting said drum surface, a plurality of pairs of inner and outer friction shoes mounted in the space between said drum surface and said flange and a plurality of compression springs mounted between said inner and outer shoes, said springs yieldably urging said shoes into frictional driving engagement with said drum surface and said flange and constituting the driving connection between said shoes, thereby providing a frictional driving engagement between said driving and driven members.

4. The invention of claim 2, wherein friction band means are interposed between said outer friction shoes and said annular flange on said driven member.

5. The invention of claim 3, wherein said inner and outer shoes each have a plurality of recesses confronting each other in axial alignment and wherein said compression springs are received in said confronting recesses.

References Cited in the file of this patent

UNITED STATES PATENTS 2,032,066     Nieman et al. _____ Feb. 25, 1936

FOREIGN PATENTS 496,800     Great Britain _____ Dec. 6, 1938